US012175975B2

(12) United States Patent
Zheng

(10) Patent No.: US 12,175,975 B2
(45) Date of Patent: Dec. 24, 2024

(54) REMOTE CONTROLLER CONTROL METHOD AND SYSTEM, STORAGE MEDIUM, AND ELECTRONIC DEVICE

(71) Applicant: BOE Technology Group Co., Ltd., Beijing (CN)

(72) Inventor: Ying Zheng, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 147 days.

(21) Appl. No.: 17/916,097

(22) PCT Filed: Oct. 13, 2021

(86) PCT No.: PCT/CN2021/123646
§ 371 (c)(1),
(2) Date: Sep. 30, 2022

(87) PCT Pub. No.: WO2022/111103
PCT Pub. Date: Jun. 2, 2022

(65) Prior Publication Data
US 2023/0169970 A1 Jun. 1, 2023

(30) Foreign Application Priority Data
Nov. 27, 2020 (CN) .......................... 202011359772.6

(51) Int. Cl.
G10L 15/22 (2006.01)
G08C 23/04 (2006.01)
(Continued)

(52) U.S. Cl.
CPC .............. G10L 15/22 (2013.01); G08C 23/04 (2013.01); H04B 10/40 (2013.01); H04B 10/50 (2013.01); H04B 10/60 (2013.01)

(58) Field of Classification Search
None
See application file for complete search history.

(56) References Cited

U.S. PATENT DOCUMENTS

2002/0143555 A1  10/2002  Luchaup
2010/0042564 A1  2/2010  Harrison et al.
(Continued)

FOREIGN PATENT DOCUMENTS

CN    101651819 A    2/2010
CN    202362929 U    8/2012
(Continued)

OTHER PUBLICATIONS

Xiangjun Shi et al., "Dynamic Hand Gesture Recognition Based on Infrared Sensor and HMM," Chinese Journal of Electron Devices, vol. 41, No. 5, Oct. 2018, 5pp.
(Continued)

Primary Examiner — Darren E Wolf
(74) Attorney, Agent, or Firm — XSENSUS LLP

(57) ABSTRACT

A control method for remote controller, including: receiving to-be-recognized audios respectively transmitted by a plurality of infrared detection systems, and recognizing each to-be-recognized audio based on a preset audio recognizing model to obtain an audio recognizing result; determining a to-be-operated infrared detection system from the infrared detection systems according to an audio loudness of each to-be-recognized audio, in a case where the audio recognizing result is determined as a valid instruction associated with controlling the remote controller; generating a drive instruction corresponding to the to-be-operated infrared detection system, and transmitting the drive instruction to the to-be-operated infrared detection system, to cause the to-be-operated infrared detection system to be in operating state; and acquiring a control instruction determined according to gesture information detected by the to-be-operated infrared (Continued)

detection system in operating state, and controlling the remote controller to perform a function corresponding to the control instruction.

11 Claims, 8 Drawing Sheets

(51) Int. Cl.
*H04B 10/40* (2013.01)
*H04B 10/50* (2013.01)
*H04B 10/60* (2013.01)

(56) References Cited

U.S. PATENT DOCUMENTS

| | | | |
|---|---|---|---|
| 2011/0018802 | A1 | 1/2011 | Sung et al. |
| 2011/0318021 | A1* | 12/2011 | Zhou .................. H04L 27/0014 375/376 |
| 2012/0239396 | A1 | 9/2012 | Johnston et al. |
| 2015/0373393 | A1 | 12/2015 | Lee et al. |
| 2017/0005819 | A1 | 1/2017 | Brandt |
| 2018/0054586 | A1 | 2/2018 | Leong |
| 2018/0243800 | A1* | 8/2018 | Kumar .................. G06N 20/00 |
| 2018/0303381 | A1* | 10/2018 | Todd .................... A61B 5/7267 |
| 2018/0315303 | A1 | 11/2018 | Durai et al. |
| 2019/0035569 | A1* | 1/2019 | Sadwick ................ H05B 45/20 |
| 2020/0202861 | A1 | 6/2020 | Esaki |

FOREIGN PATENT DOCUMENTS

| | | |
|---|---|---|
| CN | 103337242 A | 10/2013 |
| CN | 104184970 A | 12/2014 |
| CN | 104511903 A | 4/2015 |
| CN | 105240989 A | 1/2016 |
| CN | 205028454 U | 2/2016 |
| CN | 106372484 A | 2/2017 |
| CN | 107407915 A | 11/2017 |
| CN | 105929961 B | 11/2018 |
| CN | 109308159 A | 2/2019 |
| CN | 109564474 A | 4/2019 |
| CN | 110060677 A | 7/2019 |
| CN | 110703628 A | 1/2020 |
| CN | 210428799 U | 4/2020 |
| CN | 111108755 A | 5/2020 |
| CN | 111223287 A | 6/2020 |
| CN | 112489413 A | 3/2021 |
| EP | 1 313 077 A2 | 5/2003 |
| EP | 2 963 630 A2 | 1/2016 |
| JP | 2007-235613 A | 9/2007 |

OTHER PUBLICATIONS

Chinese Office Action issued Aug. 2, 2021, in corresponding Chinese Patent Application 202011359772.6, 15pp.
Chinese Notification to Grant issued Oct. 2, 2021, in corresponding Chinese Patent Application 202011359772.6, 9pp.
International Search Report and Written Opinion issued Dec. 2, 2021, in corresponding International Application No. PCT/CN2021/123646, 8pp.

* cited by examiner

REMOTE CONTROLLER CONTROL METHOD AND SYSTEM, STORAGE MEDIUM, AND ELECTRONIC DEVICE

CROSS REFERENCE

The present application is based upon International Application No. PCT/CN2021/123646, filed on Oct. 13, 2021, which is based upon and claims priority to Chinese Patent Application No. 202011359772.6, filed on Nov. 27, 2020, and the entire contents thereof are incorporated herein by reference.

TECHNICAL FIELD

The present disclosure relates to the technical field of the Internet of Things (IoT), and in particular, to a control method for remote controller, a control system for remote controller, a computer non-transitory readable storage medium, and an electronic device.

BACKGROUND

The methods commonly used in the market to control household appliances may include infrared remote control and intelligent hardware control. However, these control methods all require an external controller to control the electrical appliance, and it is extremely inconvenient to control the electrical appliance when there is no remote controller or it is inconvenient to operate the remote controller.

SUMMARY

According to one aspect of the present disclosure, a method for controlling a remote controller is provided, including:
receiving to-be-recognized audios respectively transmitted by a plurality of infrared detection systems, and recognizing each to-be-recognized audio based on a preset audio recognizing model to obtain an audio recognizing result;
determining a to-be-operated infrared detection system from the infrared detection systems according to an audio loudness of each to-be-recognized audio, in a case where the audio recognizing result is determined as a valid instruction associated with controlling the remote controller;
generating a drive instruction corresponding to the to-be-operated infrared detection system, and transmitting the drive instruction to the to-be-operated infrared detection system, to cause the to-be-operated infrared detection system to be in operating state; and
acquiring a control instruction determined according to gesture information detected by the to-be-operated infrared detection system in operating state, and controlling the remote controller to perform a function corresponding to the control instruction.
In an exemplary embodiment of the present disclosure, the remote controller includes a plurality of sub-remote controllers for controlling different devices respectively;
wherein after recognizing each to-be-recognized audio to obtain the audio recognizing result, the control method further includes:
determining whether the audio recognizing result is a valid instruction associated with controlling any sub-remote controller in the remote controller, according to a remote controller matching rule;
wherein, the remote controller matching rule is determined according to a remote controller parameter.
In an exemplary embodiment of the present disclosure, the determining the to-be-operated infrared detection system from the infrared detection systems according to the audio loudness of each to-be-recognized audio includes:
detecting a size of audio decibel included in the to-be-recognized audio, and sorting each to-be-recognized audio according to the size of audio decibel; and
determining the to-be-recognized audio with largest audio decibel according to a sorting result, and determining the infrared detection system having the to-be-recognized audio with largest audio decibel as the to-be-operated infrared detection system.
In an exemplary embodiment of the present disclosure, the acquiring the control instruction determined according to gesture information detected by the to-be-operated infrared detection system in operating state includes:
receiving gesture information generated according to a gesture image detected by the to-be-operated infrared detection system and transmitted by the to-be-operated infrared detection system in operating state;
determining whether the gesture information is a valid gesture according to a gesture matching rule in a case where it is determined that the gesture information includes a gesture shape, wherein the gesture matching rule is generated according to a function that the remote controller is able to perform; and
acquiring the control instruction corresponding to the gesture information in a case where the gesture information is determined as the valid gesture.
In an exemplary embodiment of the present disclosure, the control method further includes:
determining a next to-be-recognized audio neighboring to the to-be-recognized audio with the largest audio decibel according to the sorting result, in a case where it is determined that the gesture information includes no gesture shape;
determining the infrared detection system corresponding to the next to-be-recognized audio as the to-be-operated infrared detection system; and
generating a driving instruction corresponding to the to-be-operated infrared detection system, and transmitting the driving instruction to the to-be-operated infrared detection system, to cause the to-be-operated infrared detection system to be in operating state.
In an exemplary embodiment of the present disclosure, the recognizing each to-be-recognized audio based on the preset audio recognizing model to obtain the audio recognizing result includes:
recognizing the each to-be-recognized audio using the preset audio recognizing model to obtain the audio recognizing result, wherein the preset audio recognizing model includes one or more of a deep neural network, a convolutional neural network, a long short-term memory network, and a hidden Marko network.
In an exemplary embodiment of the present disclosure, the control method further includes:
calculating a number of infrared detection systems required to be disposed in a current space, according to a space size of the current space where the remote controller is located and attribute information of each infrared detection system.
In an exemplary embodiment of the present disclosure, the control method further includes:

calculating an operating area of each infrared detection system according to the space size and the attribute information, and calculating a to-be-installed position of each infrared detection system according to the operating area.

In an exemplary embodiment of the present disclosure, the control method further includes:

calculating an operating dead zone of each infrared detection system according to the current space and the operating area; and adjusting the to-be-installed position according to the operating dead zone to obtain a target installing position.

According to an aspect of the present disclosure, a system for controlling remote controller is provided, including:

a plurality of infrared detection systems, a processor and a memory, each infrared detection system is respectively connected in communication with the processor and the memory;

each infrared detection system includes a controller, an audio receiving device and an infrared sensor, and the audio receiving device and the infrared sensor are connected in communication with the controller;

the controller is configured to control the audio receiving device and the infrared sensor to be in operating state, and transmit a to-be-recognized audio received by the audio receiving device to the processor;

the audio receiving device is used for receiving the to-be-recognized audio, and the infrared sensor is used for receiving gesture information; and the memory is stored with computer instructions, and the processor is configured to execute the computer instructions to implement anyone of the above control method for remote controller.

In an exemplary embodiment of the present disclosure, the processor is further stored with an application program, and the application program is executed by the processor to perform: configuring system codes for each infrared detection system, and adding parameter information of the remote controller through the application program and storing the parameter in the memory.

In an exemplary embodiment of the present disclosure, the infrared detection system and the processor and memory communicate via a local area network.

According to an aspect of the present disclosure, a computer non-transitory readable storage medium is provided, on which a computer program is stored, wherein when the computer program is executed by a processor, anyone of the above control method for remote controller is implemented.

According to an aspect of the present disclosure, an electronic device is provided, including:

a processor; and a memory for storing executable instructions for the processor;

wherein, the processor is configured to implement anyone of the above control method for remote controller by executing the executable instruction.

According to an aspect of the present disclosure, an electronic device is provided, including:

a processor; and a memory for storing executable instructions for the processor;

wherein, the processor is configured to implement anyone of the above control method for remote controller by executing the executable instruction.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the disclosure and together with the description serve to explain the principles of the disclosure. Obviously, the drawings in the following description are only some embodiments of the present disclosure, and for those of ordinary skill in the art, other drawings can also be obtained from these drawings without creative effort. In the drawings.

DETAILED DESCRIPTION

Figure 1:
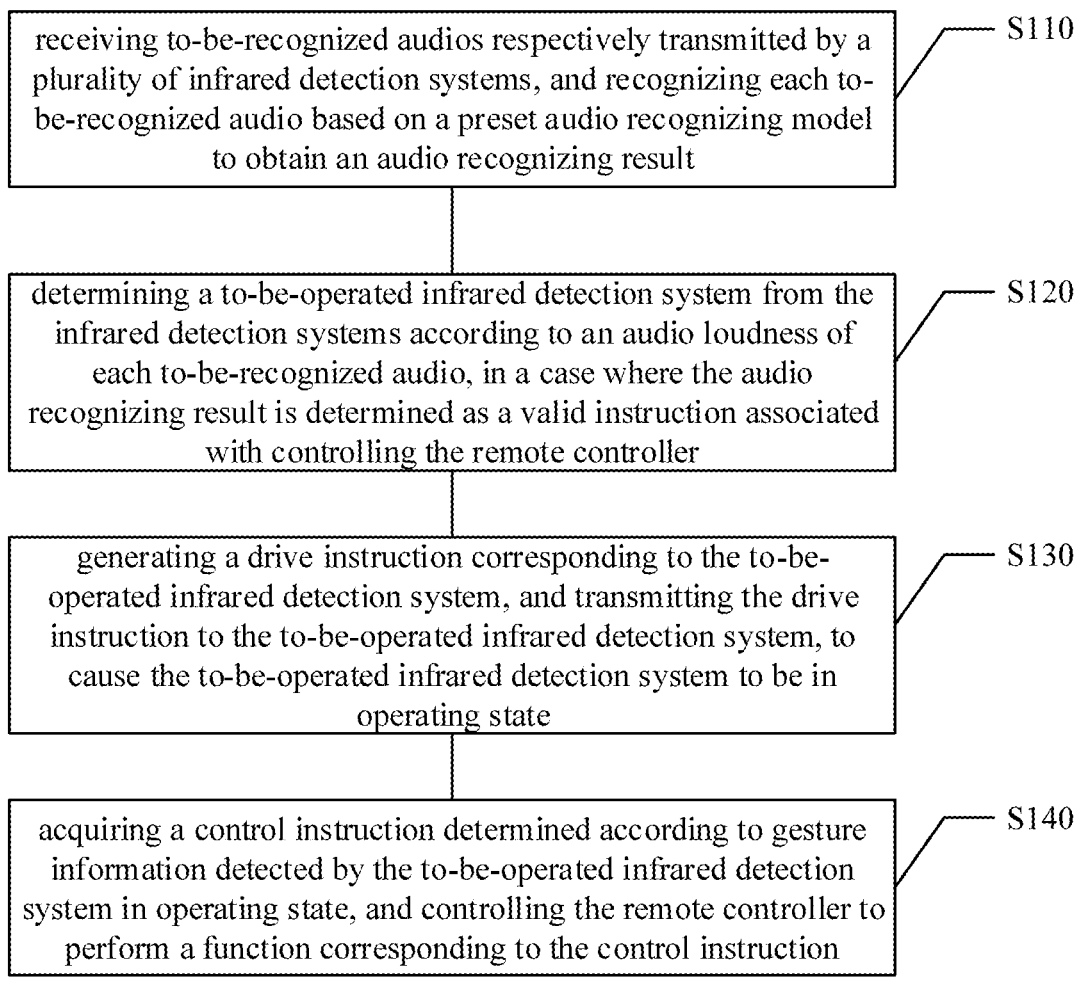
FIG. 1 schematically shows a flowchart of a method for controlling remote controller according to an exemplary embodiment of the present invention.

Example embodiments will now be described more fully with reference to the accompanying drawings. Example embodiments, however, can be embodied in various forms and should not be construed as limited to the examples set forth herein; rather, these embodiments are provided so that this disclosure will be thorough and complete, and will fully convey the concept of example embodiments to those skilled in the art. The described features, structures, or characteristics may be combined in any suitable manner in one or more embodiments.

Furthermore, the drawings are merely schematic illustrations of the present disclosure and are not necessarily drawn to scale. The same reference numerals in the drawings denote the same or similar parts, and thus their repeated descriptions will be omitted. Some of the block diagrams shown in the figures are functional entities that do not necessarily correspond to physically or logically separate entities. These functional entities may be implemented in software, or in one or more hardware modules or integrated circuits, or in different networks and/or processor devices and/or microcontroller devices.

In some remote controller control schemes, since the voice remote controller needs to perform semantic understanding and semantic analysis on the voice information when controlling the device, but the remote controller itself lacks the functions of semantic understanding and semantic analysis. It needs to upload the received voice information to the server, and in turn, control the remote controller according to the analysis result sent by the server. Therefore, in the absence of an effective network, it is impossible to recognize the voice information. At the same time, since the gesture controller collects user gestures, it also collects the user's personal information, thereby making the user's personal information less secure.

This exemplary embodiment first provides a method for controlling remote controller, which can be implemented on a system on chip (SoC), and the SoC can be set in an intelligent electronic device, a server, a server cluster, or a cloud server. Of course, those skilled in the art can also implement the method of the present invention on other platforms as required, which is not particularly limited in this exemplary embodiment. Referring to FIG. 1, the method for controlling remote controller may include the following steps:

Step S110, receiving to-be-recognized audios respectively transmitted by a plurality of infrared detection systems, and recognizing each to-be-recognized audio based on a preset audio recognizing model to obtain an audio recognizing result;

Step S120, determining a to-be-operated infrared detection system from the infrared detection systems according to an audio loudness of each to-be-recognized audio, in a case where the audio recognizing result is determined as a valid instruction associated with controlling the remote controller;

Step S130, generating a drive instruction corresponding to the to-be-operated infrared detection system, and transmitting the drive instruction to the to-be-operated infrared detection system, to cause the to-be-operated infrared detection system to be in operating state; and Step S140, acquiring a control instruction determined according to gesture information detected by the to-be-operated infrared detection system in operating state, and controlling the remote controller to perform a function corresponding to the control instruction.

In the above control method for remote controller, on the one hand, by receiving to-be-recognized audios respectively transmitted by a plurality of infrared detection systems, and recognizing each to-be-recognized audio based on a preset audio recognizing model to obtain an audio recognizing result; then determining a to-be-operated infrared detection system from the infrared detection systems according to an audio loudness of each to-be-recognized audio, in a case where the audio recognizing result is determined as a valid instruction associated with controlling the remote controller; then generating a drive instruction corresponding to the to-be-operated infrared detection system, and transmitting the drive instruction to the to-be-operated infrared detection system, to cause the to-be-operated infrared detection system to be in operating state; and lastly acquiring a control instruction determined according to gesture information detected by the to-be-operated infrared detection system in operating state, and controlling the remote controller to perform a function corresponding to the control instruction, since the audio to be recognized can be recognized directly based on the audio recognizing model to obtain the audio recognizing result, thereby avoiding the inability to realize the audio recognition in the absence of an effective network. On the other hand, since the gesture information is detected by the infrared detection system, it is not necessary to collect the gesture information through the camera, which can avoid the problem in the art that during the process of collecting user gestures by the gesture controller, the user's personal information will also be collected, so that the security of the user's personal information is low. On yet another aspect, by determining the to-be-operated infrared detection system from the infrared detection systems according to the audio loudness of each to-be-recognized audio, it can determine the infrared detection system closest to the initiator of the audio to be recognized, so that the accuracy of the acquired gesture information can be improved. Further, by determining the to-be-operated infrared detection system from the infrared detection systems according to the audio loudness of each to-be-recognized audio, and then generating the drive instruction corresponding to the to-be-operated infrared detection system, and transmitting the drive instruction to the to-be-operated infrared detection system, to cause the to-be-operated infrared detection system to be in operating state, it can therefore avoid the problem of waste of resources caused by the long-term operating state of the infrared detection system, and meanwhile can also avoid the problem of confusion of control instructions caused by simultaneous detection of gesture information by multiple infrared detection systems.

Hereinafter, the control method of the remote controller described in the present invention will be explained and described in detail with reference to the accompanying drawings.

First, the purpose of the invention of the present disclosure is explained and described. Specifically, the present invention discloses a remote controller system with multi-function gesture control based on the principle of light sensing. Since the existing smart remote controller control system is based on the principle of camera detection, it cannot meet the privacy protection requirements of camera-free proposed by smart home users. Therefore, in the present invention, by presetting corresponding functions of the corresponding device remote controller and the corresponding gestures, and then by detecting the light and shadow image formed by the projection of the gestures, and then performing remote control operation to the corresponding device, it is possible to effectively realizes a remote controller with a more flexible multi-device control and the family privacy protection function, and it can also solve the sanitary problem caused by using a remote controller while eating something with the user's hands.

Figure 2:
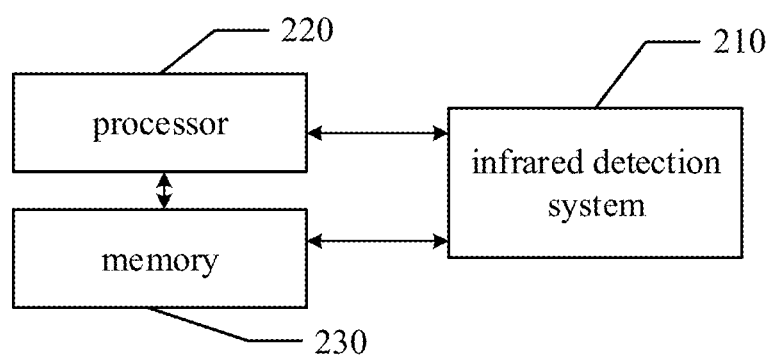
FIG. 2 schematically shows a block diagram of a system for controlling remote controller according to an exemplary embodiment of the present invention.

Next, the system for controlling remote controller provided by the present disclosure will be explained and described with reference to FIG. 2. Referring to FIG. 2, the system for controlling remote controller may include an infrared detection system 210, a processor 220, and a memory 230. The infrared detection system 210 is communicatively connected to the processor 220 and the memory 230. Specifically, communication may be performed through a local area network, for example, it can perform communicate through WIFI, Bluetooth, and the like.

Figure 3:
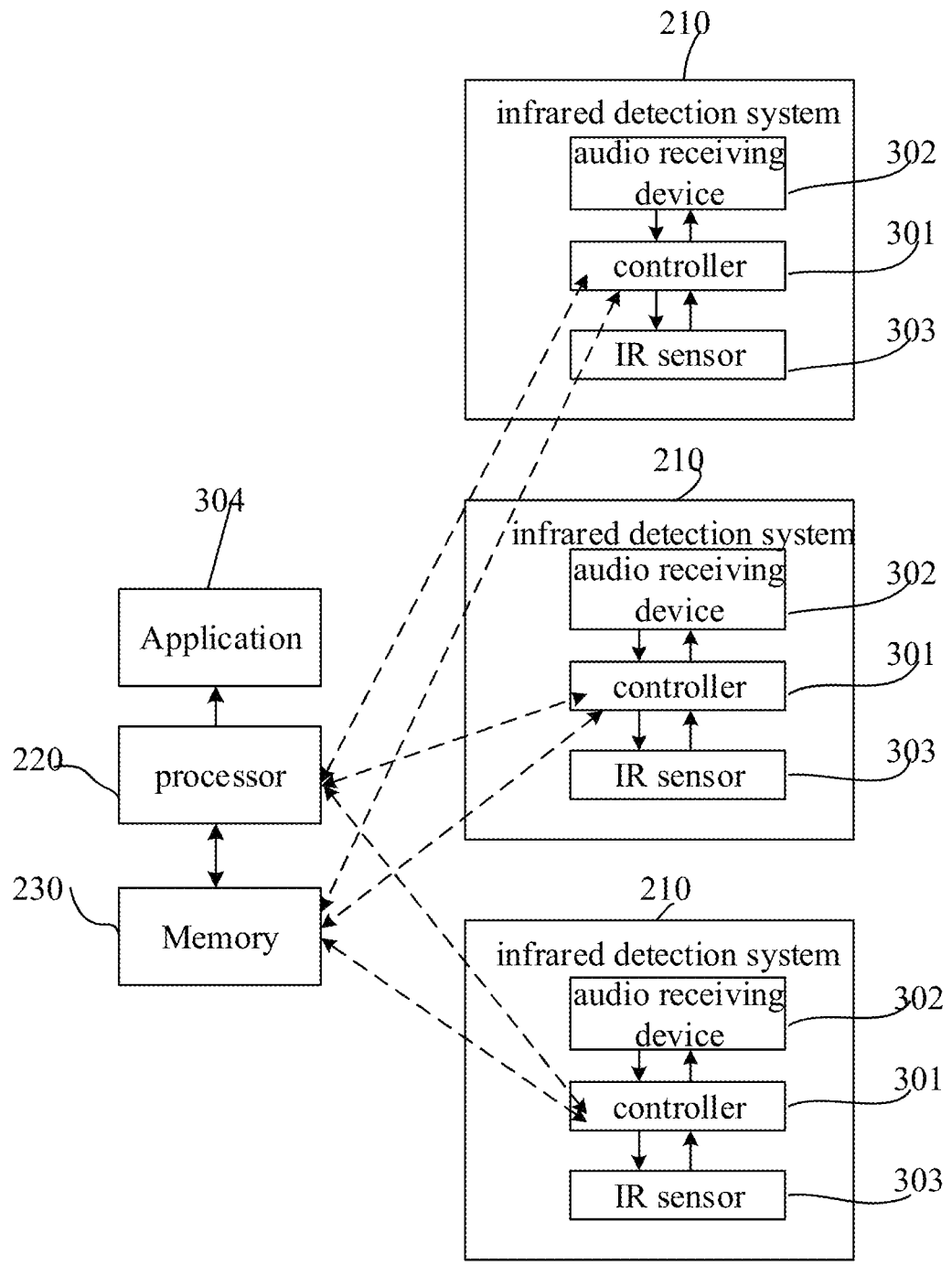
FIG. 3 schematically shows a block diagram of another system for controlling remote controller according to an exemplary embodiment of the present invention.

Further, as shown in FIG. 3, in the current space where each remote controller is located, one or more infrared detection systems 210 may be included, and each infrared detection system 210 may include a controller (Microcontroller Unit, MCU) 301, an audio receiving device 302 and an infrared sensor 303, wherein the audio receiving device and the infrared sensor are communicatively connected to the controller, and the infrared detection system is communicatively connected to the processor through the controller. Meanwhile, the controller can be used to control the audio receiving device and the infrared sensor to be in operating state, and sending the to-be-recognized audio received by the audio receiving device to the processor. The audio receiving device is used to receive the to-be-recognized audio, and the infrared sensor is used to receive gesture information.

Specifically, as shown in FIG. 3, when the infrared detection system 210 is powered on, the controller 301 drives the audio receiving device to be in a low energy consumption state, and drives the infrared receiving device to be in a sleeping state. When the audio receiving device receives a to-be-recognized audio (the user's voice information), the to-be-recognized audio can be sent to the SoC, so that the SoC can perform subsequent processes. Further, when the controller receives the driving instruction, the infrared sensor is driven to operating state, so that the infrared sensor can receive the user's gesture information. In the embodiment, the audio receiving apparatus may be a single microphone or a microphone array, or may be other devices that can be used to receive voice information, such as a tape recorder, etc., which is not particularly limited in this example.

Further, computer instructions are stored on the above-mentioned memory, and the above-mentioned processor is used to execute the computer instructions to realize the control method of the remote controller described in the present disclosure, and the memory and the processor can be integrated in a system-on-chip (SoC). As shown in 3, the processor also stores an application program (App, Application) 304, which is executed by the processor to perform: configuring system codes for each infrared detection system, and adding parameter information of the remote controller through the application program and storing the parameter in the memory.

For example, due to the limited operating range of the infrared detection system, in a certain space where the remote controller is located, there is generally no situation where there is only one infrared detection system. Therefore, in order to avoid the problem of sending errors in the process of sending instructions due to too many infrared detection systems, the user can configure corresponding system codes for infrared detection systems at different locations in the application program to show the difference. For example, 001, 002, 003, etc., and it can also be other encoding methods, which are not limited in this example.

Meanwhile, in order to control the remote controller by using the corresponding control instruction, it also needs to add parameter information of the remote controller through the application program, and the parameter information may include the model of the remote controller, the device to be controlled, the name of the remote controller, and so on. Specifically, the user can add the parameter information of one or more remote controllers in different spaces and controlling different devices through the application program, for example, adding the air conditioner remote controller in the bedroom, the TV remote controller in the living room, etc., and then storing the added parameter information in the memory.

Figure 4:
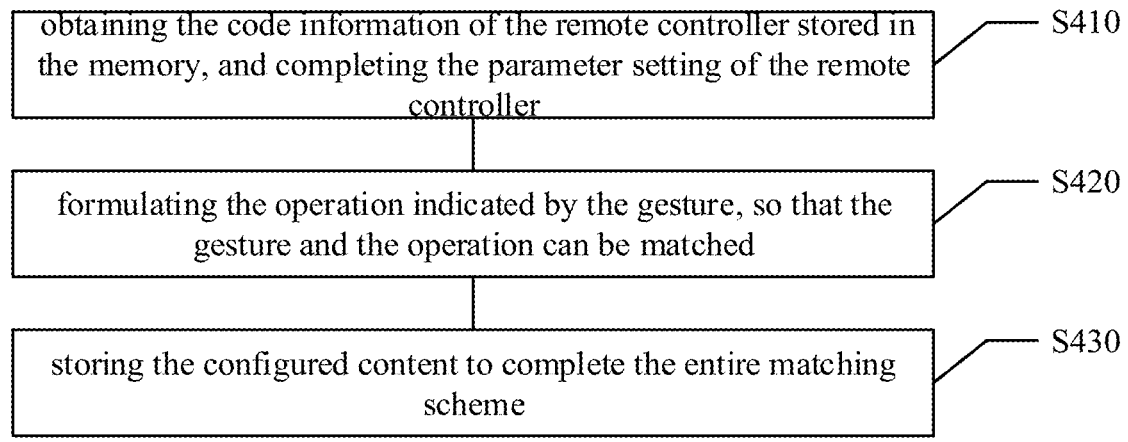
FIG. 4 schematically shows a flowchart of a method for configuring a remote controller according to an exemplary embodiment of the present invention.

Further, after completing the binding of the remote controller, it may further set different matching schemes for operation gestures for the remote controller. Specifically, referring to FIG. 4, the specific matching process of the operation gesture matching scheme may include the following steps:

Step S410, obtaining the code information of the remote controller stored in the memory, and completing the parameter setting of the remote controller; wherein the parameter may include the specific information of the device that the remote controller can control, the parameter of the remote controller itself, the spatial location to be controlled by the remote controller, etc., and may also include other information, such as the specific operating time period of the remote controller, etc. which is not specially limited by this example;

Step S420, formulating the operation indicated by the gesture, so that the gesture and the operation can be matched; for example, for a TV remote controller in the living room, raising one finger means turning on the TV, raising two fingers means increasing the volume, raising three fingers means changing channels, etc.; and In step S430, storing the configured content to complete the entire matching scheme.

It should be further noted that when adding or deleting the remote controller or gesture, it may also be added or deleted through the application program. In this way, it is possible to avoid the case where inconvenience of use is caused by too many or too few gestures, or too many or too few remote controllers, and further improves the user experience.

Figure 5:
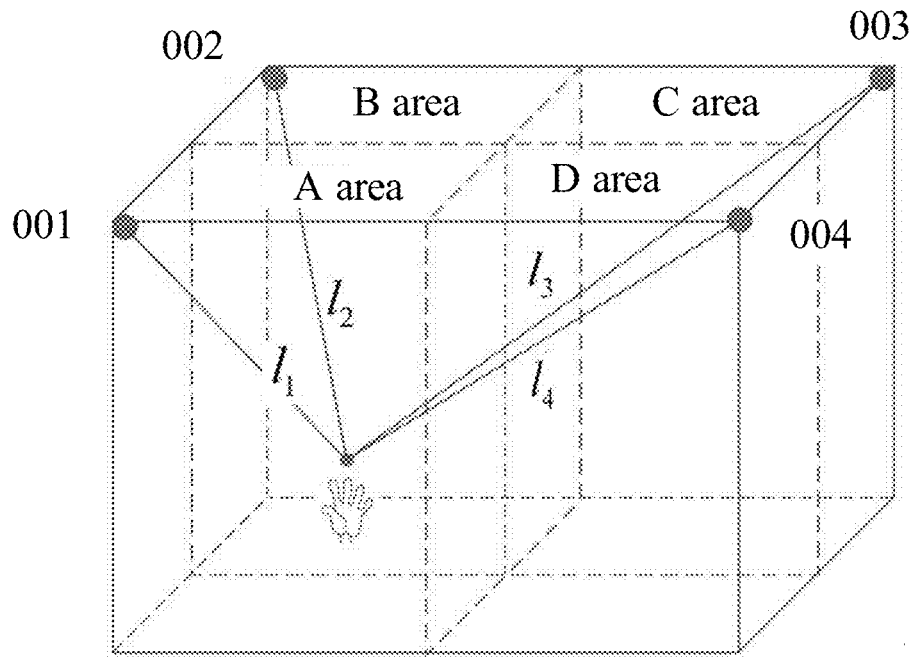
FIG. 5 schematically shows an example diagram of an application scenario of a method for controlling remote controller according to an exemplary embodiment of the present invention.

Further, as shown in FIG. 5, the present disclosure realizes the whole-house multi-directional gesture detection through the cooperation of multiple detection systems 001, 002, 003 and 004. For example, the detection systems 001, 002, 003, and 004 divide the room into four areas, A, B, C, and D. When the infrared detection system receives the voice information, the distance from the gesture issuing point to the infrared detection system can be measured according to the received voice information. The remote controller device only needs to realize the wake-up function through the offline voice sent by the processor within the scope of the local area network, and then the corresponding device can be controlled, to solve the drawback that the voice remote controller on the market needs to rely on the public network for semantic understanding.

So far, the remote controller can be controlled according to the received gesture information.

Hereinafter, steps S110 to S140 will be explained and described with reference to FIG. 2, FIG. 3 and FIG. 5.

In step S110, to-be-recognized audios respectively sent by a plurality of infrared detection systems are received, and each of the to-be-recognized audios is recognized based on a preset audio recognizing model to obtain an audio recognizing result.

In this exemplary embodiment, first, to-be-recognized audios respectively sent by controllers included in a plurality of infrared detection systems are received. The respective to-be-recognized audio is received by the audio receiving device included in the respective infrared detection system, and the to-be-recognized audio sent by each infrared detection system have different audio loudness while have the same audio information. Then, each of the to-be-recognized audios is recognized based on a preset audio recognizing model to obtain an audio recognizing result. The preset audio recognizing model includes one or more of a deep neural network, a convolutional neural network, a long short-term memory network, and a hidden Markov model.

For example, when the audio receiving device (microphone array) receives the user's voice information, it sends the voice information to the controller, and then the controller sends the voice information to the processor. After the processor receives the user's voice information, the preset algorithm recognition model is invoked to recognize the to-be-recognized voice, and then the voice recognizing result is obtained.

Here, taking the preset voice recognition model being the convolutional neural network to explain and illustrate the specific recognition process of the to-be-recognized voice. First, preprocess the to-be-recognized voice, which may specifically include removing the silence at the beginning and the end to reduce the interference to the subsequent steps, and then dividing the sound into frames to cut the sound into multiple sequence frames. The frames are generally overlapped therebetween. Secondly, feature extraction is performed. Specifically, using cepstral coefficients to turn each frame of waveform into a multi-dimensional vector containing sound information. Then, processing the multi-dimensional vector using the convolutional layer, excitation layer, pooling layer and fully connected layer of the convolutional neural network, to obtain corresponding voice recognizing result, for example, turn on the TV or turn off the air conditioner, etc.

In step S120, when it is determined that the audio recognizing result is a valid instruction associated with controlling the remote controller, the to-be-operated infrared detection system is determined from the infrared detection systems according to the audio loudness of each to-be-recognized audio.

In this exemplary embodiment, in order to determine the to-be-operated infrared sensor, it is first needed to determine that the audio recognizing result is a valid instruction associated with the control remote controller. That is, only when it is determined that some functions need to be performed by a remote controller, it is necessary to determine the to-be-operated infrared sensor. The remote controller described in the present disclosure may have multiple sub-remote controllers, and each sub-remote controller controls different devices. A specific determination method may include: according to a remote controller matching rule, judging whether the audio recognizing result is a valid instruction associated with controlling any sub-remote controller in the remote controller, wherein the remote controller matching rule is determined according to the remote controller parameter. For example, the first matching rule may include activating a TV remote controller, activating an air conditioner remote controller, activating a refrigerator remote controller, and the like. When the voice recognition result exists in the remote controller matching rule, it can be determined that the audio recognizing result is a valid instruction associated with controlling a certain sub-remote controller in the remote controller. And, when it is determined that it is a valid command, the processor wakes up the sub remote controller. By this method, the problem of resource waste caused by the sub-remote controller being in operating state for a long time can be avoided, and the burden of the system can also be reduced.

Further, when it is determined that the audio recognizing result is a valid instruction associated with controlling the remote controller, the to-be-operated infrared sensor can be determined according to the audio decibel size. Specifically, the process may include: first, detecting the size of the audio decibels included in each of the to-be-recognized audios, and sorting each of the to-be-recognized audios according to the size of each of the audio decibels. Secondly, according to the sorting result, determine the to-be-recognized audio with the largest audio decibel, and determine the infrared detection system where the to-be-recognized audio with the largest audio decibel is located as the to-be-operated infrared detection system. For example, the processor can identify the audio loudness of the to-be-recognized audio sent by each controller, and then can determine the infrared sensor included in the infrared detection system where the controller with the largest audio decibel is located as the infrared sensor closest to the user, i.e., the to-be-operated infrared sensor. By this method, the accuracy of the acquired gesture information can be improved, thereby ensuring the validity of the control instruction.

In step S130, a drive instruction corresponding to the to-be-operated infrared detection system is generated, and the drive instruction is sent to the to-be-operated infrared detection system, to cause the to-be-operated infrared detection system to be in operating state.

For example, in the example diagram shown in FIG. 5, the distances from the area where the gesture is located to the infrared detection systems 001, 002, 003, and 004 are: $l_1$, $l_2$, $l_3$ and $l_4$, and based on the detection results of the decibel size of the to-be-recognized audio, it can be known that $l_1$ is the closest distance, so the infrared sensor included in the infrared detection system 001 can be used as a to-be-operated infrared sensor. Based on this, the processor can generate a drive corresponding to the to-be-operated infrared sensor and send the instruction to the controller in the infrared detection system where the to-be-operated infrared sensor is located, so that the controller in the infrared detection system drives the to-be-operated infrared sensor to be in operating state according to the driving instruction. Based on this method, the problem of resource waste caused by the long-term operating state of the infrared sensor can be avoided, and the problem of confusion of control instructions caused by the simultaneous detection of gesture information by multiple infrared sensors can also be avoided.

In step S140, a control instruction determined according to the gesture information detected by the to-be-operated infrared detection system in operating state is acquired, and the remote controller is controlled to execute a function corresponding to the control instruction.

Figure 6:
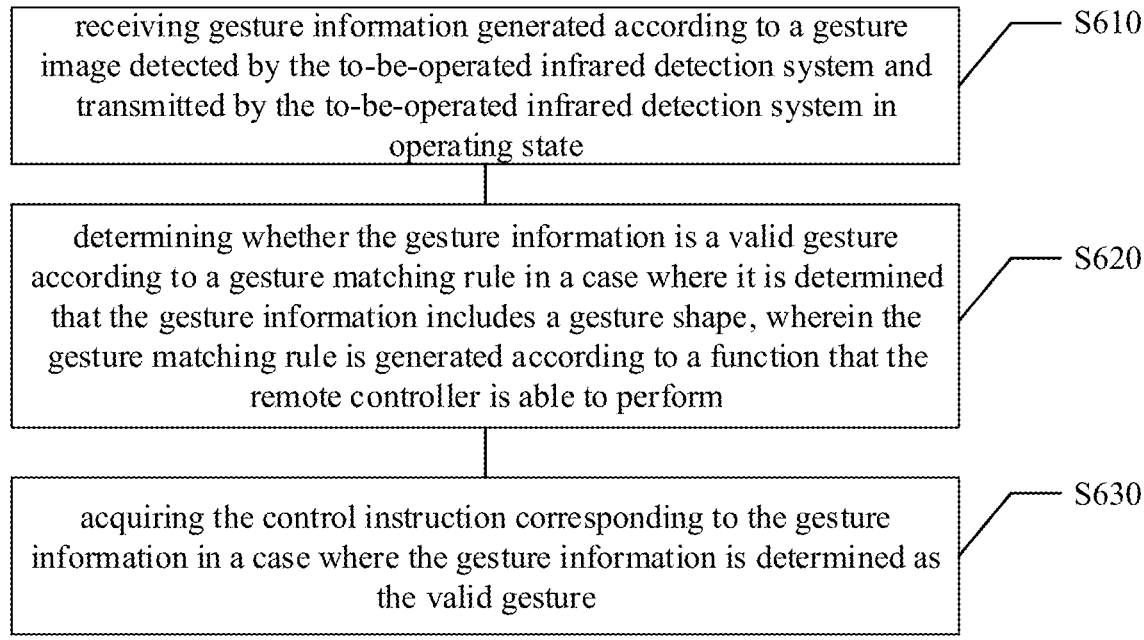
FIG. 6 schematically shows a flowchart of a method for acquiring a control instruction determined according to gesture information detected by the to-be-operated infrared sensor, according to an exemplary embodiment of the present invention.

In this exemplary embodiment, referring to FIG. 6, acquiring the control instruction determined according to the gesture information detected by the to-be-operated infrared sensor may include steps S610 to S630, wherein:

in step S610, receiving gesture information generated according to a gesture image detected by the to-be-operated infrared detection system and transmitted by the to-be-operated infrared detection system in operating state;

in step S620, determining whether the gesture information is a valid gesture according to a gesture matching rule in a case where it is determined that the gesture information includes a gesture shape, wherein the gesture matching rule is generated according to a function that the remote controller is able to perform; and in step S630, acquiring the control instruction corresponding to the gesture information in a case where the gesture information is determined as the valid gesture.

Hereinafter, step S610-step S630 are explained and illustrated. First, when the infrared sensor in the to-be-operated infrared detection system is in operating state, it can detect the light and shadow picture formed by the projection of the user's gesture, and then generate the corresponding gesture information based on the preset infrared gesture detection algorithm; wherein, the specific calculation process of the infrared gesture detection algorithm can include: when the infrared sensor detects the user's gesture in the operating area where it is located, the signal emitted by the infrared light source is reflected, the infrared sensor receives a feature code from the infrared emitting light source, which may include feature information of the gesture action, and then the features are demodulated, and the gesture recognition algorithm program is used to extract the feature information of the gesture action based on the demodulated feature code, and the above gesture information is generated based on the extracted feature information; wherein the gesture recognition algorithm may include a template matching algorithm, a neural network algorithm and hidden Markov algorithm, etc., which is not specially limited in this example.

Further, when the gesture information is obtained, the controller sends the gesture information to the processor, and the processor, after receiving the gesture information, can determine whether the gesture information includes a specific gesture shape, and if yes, then directly match whether there is an instruction corresponding to the gesture information from the gesture instructions corresponding to the remote controller, and if yes, the control instruction corresponding to the gesture information is obtained, and the remote controller is controlled to perform the function corresponding to the control instruction, such as lowering the volume of the TV or turning off the TV, etc. It should be additionally noted here that the above gesture matching rules can be determined according to the functions that the remote controller can perform, and each sub-remote controller corresponds to a gesture matching rule. The gesture matching rules can include, for example, for the TV remote controller, raising one finger means turning on the TV, raising two fingers means turning up the volume, etc. There is no special restriction in this example.

Further, when said gesture information does not include a gesture shape, the control method of said remote controller may further include: determining a next to-be-recognized audio neighboring to the to-be-recognized audio with the largest audio decibel according to the sorting result, in a case where it is determined that the gesture information includes no gesture shape; determining the infrared detection system corresponding to the next to-be-recognized audio as the to-be-operated infrared detection system; and generating a driving instruction corresponding to the to-be-operated infrared detection system, and transmitting the driving instruction to the to-be-operated infrared detection system, to cause the to-be-operated infrared detection system to be in operating state.

Figure 7:
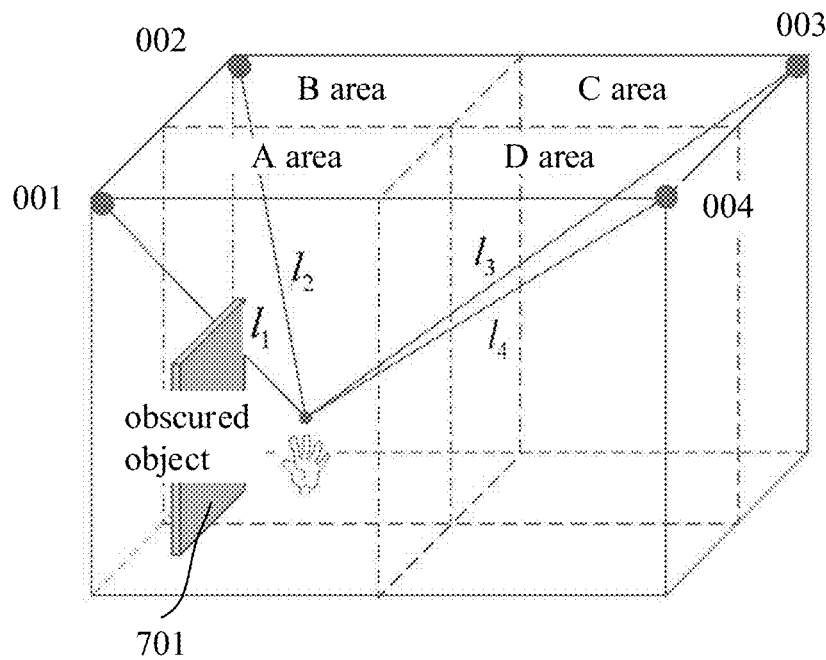
FIG. 7 schematically shows an example diagram of an application scenario of another method for controlling remote controller according to an exemplary embodiment of the present invention.

Specifically, if the gesture information is not a valid gesture, there are two possibilities for the situation: the gesture that actually gives the command is obscured by other objects, or no valid command is given. In the case where the gesture of the command is obscured by other objects (the specific scenario can be referred to FIG. 7, where the 701 shown in FIG. 7 is the obscured object), when the to-be-operated infrared sensor in the current operating state does not detect a valid gesture, the next infrared detection system next to the current infrared detection system will be waken up in succession according to the order of the received volume from smallest to largest, that is, the infrared sensor included in the corresponding infrared detection system 002 in FIG. 7. Afterwards, the steps of driving the infrared sensor to be in operating state are repeated, until finally a valid gesture is finally detected (before the next infrared detector sleeping time arrives). The operating time of the infrared sensor is set to 30s, and when a valid gesture is detected in this time period, the whole control process ends; when no valid gesture is detected in that time period, the whole control process fails and delivering of the gesture command is discarded this time. By this method, the problem of reading gestures failing due to the blockage of objects in the house in the prior art can be solved.

Further, if the gesture information includes a gesture shape, but the gesture shape does not exist in the above gesture matching rule, judging whether the time that the to-be-operated infrared sensor is in the operating state is greater than 30s. If yes, the instruction execution fails; and if no, judging whether infrared detection system including the to-be-operated infrared sensor is the last infrared detection system. If yes, the to-be-operated infrared sensor is reawakened and the subsequent process is executed; and if no, the user gesture is re-detected. That is, if all the infrared sensors are in operating state, but still no valid gesture is detected, the gesture detection can be repeated before the next sleeping time of each infrared sensor, until the control of the remote controller is completed.

Hereinafter, the installation location, the number of installations, and the operating area of the infrared detection system in the room as described in this disclosure will be explained and illustrated.

First, the number of installations needs to be calculated, and the specific calculation method may include: calculating a number of infrared detection systems required to be disposed in a current space, according to a space size of the current space where the remote controller is located and attribute information of the infrared sensor included in each infrared detection system. The attribute information of the infrared sensors may include, for example, the name of the infrared sensor, the model number and the operating range it can support. Thus, the number of infrared detection systems required in the room may be calculated based on the space size of the room and the supported operating range.

Next, the installation position and the operating area are need to be calculated, the specific calculation method can include: calculating an operating area of each infrared detection system according to the space size and the attribute information, and calculating a to-be-installed position of each infrared detection system according to the operating area.

Further, in order to be able to reduce the dead zone, it is necessary to further optimize the operating area and the installation position, which can specifically include: firstly, calculating an operating dead zone of each infrared detection system according to the current space and the operating area; and secondly, adjusting the to-be-installed position according to the operating dead zone to obtain a target installing position.

Figure 8:
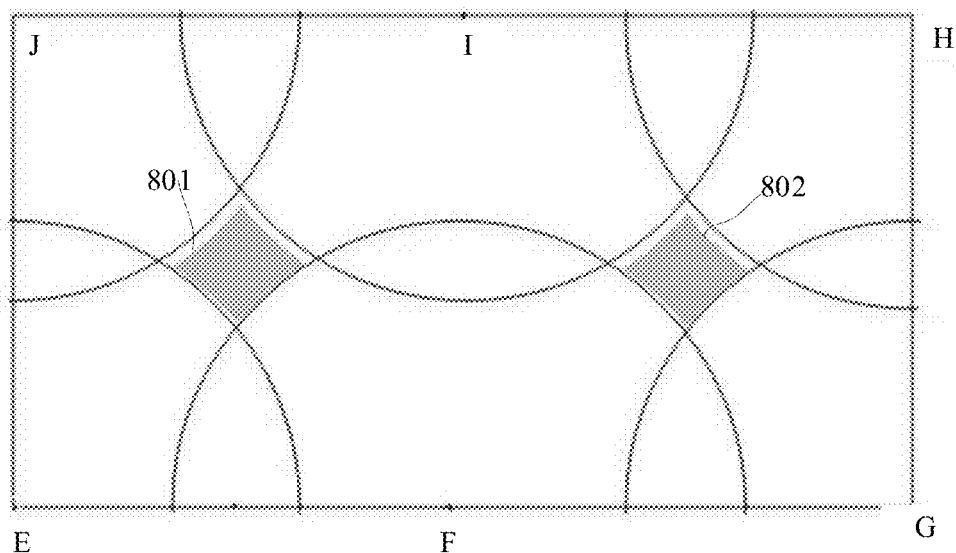
FIG. 8 schematically shows an example diagram of an application scenario of another method for controlling remote controller according to an exemplary embodiment of the present invention.

Specifically, referring to FIG. 8, assume that the room is a rectangular area enclosed by EFGHIJ, and the distance between each infrared detection system is D. Set the preset margin as Δd, then the radius of the operating area of the infrared detection system is D−Δd. In FIG. 8, the distance between EF is 2(D−Δd), and the diamond-shaped area 801 and 802 are the operating dead zones. Thus, in order to reduce the operating dead zone, the overlap distance between the operating areas of the infrared detection systems (i.e., the sector area, or the semicircle area), so that the to-be-installed positions of the infrared detection systems are adjusted according to the adjusted distances, to obtain the above target installing position. Then, each infrared detection system is installed according to the target installing position, so as to achieve the maximum reduction of the operating dead zone, until there is no dead zone.

Figure 9:
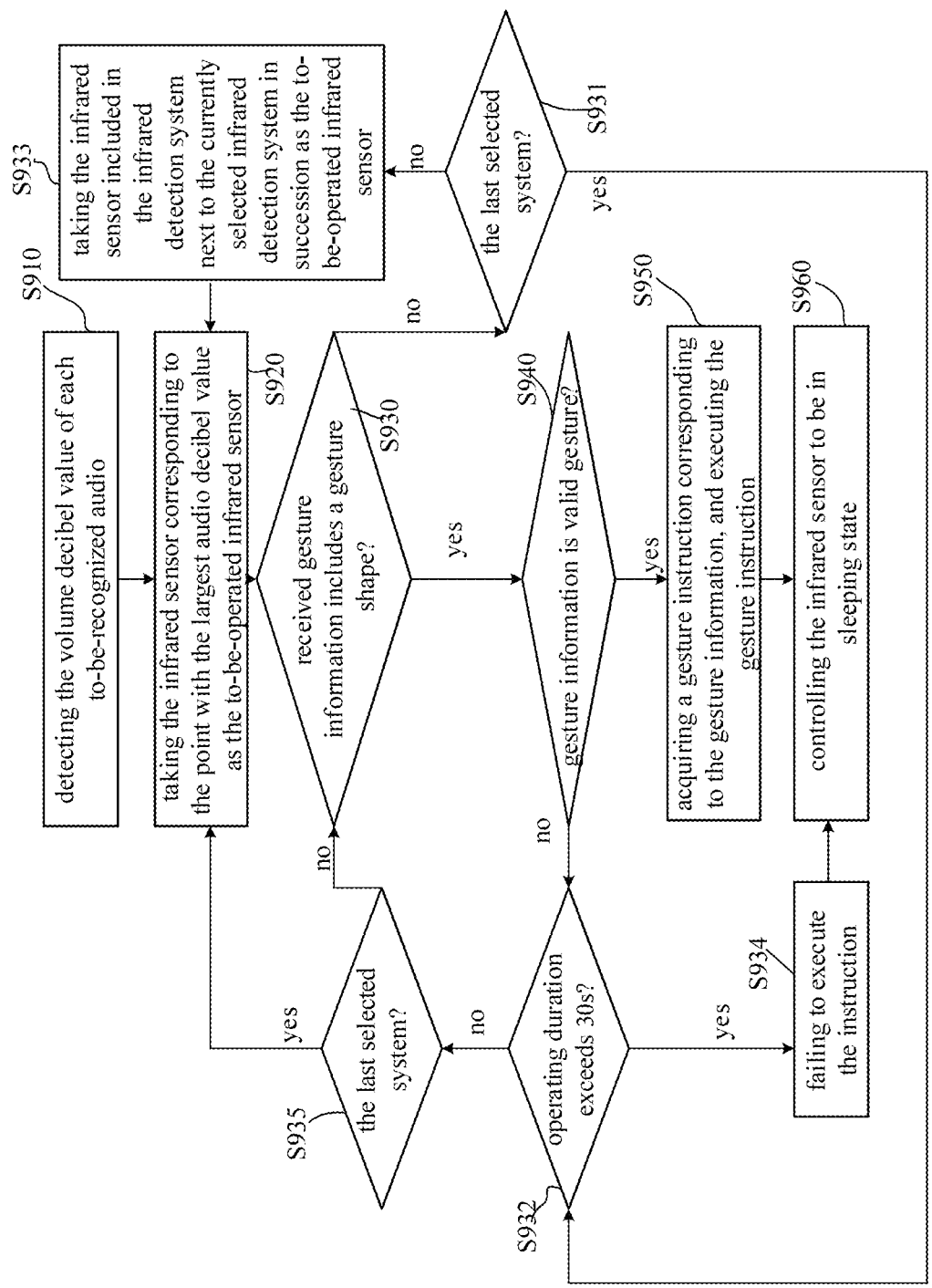
FIG. 9 schematically shows a flowchart of another method for controlling remote controller according to an exemplary embodiment of the present invention.

Hereinafter, the control method of the remote controller of the present disclosure will be further explained and illustrated in connection with FIG. 9. Specifically, with reference to FIG. 9, the control method of the remote controller may include the steps of:

Step S910, using a voice recognition algorithm, waking up the corresponding remote controller and detecting the volume decibel value of each to-be-recognized audio; and Step S920, sorting the volume decibel values of each to-be-recognized audio in the order from largest to smallest, and taking the infrared sensor corresponding to the point with the largest audio decibel value as the to-be-operated infrared sensor;

step S930, drive the to-be-operated infrared sensor to be in operating state and invoking the infrared gesture detection algorithm to determine whether the received gesture information includes a gesture shape; if yes, go to step S940, and if no, go to step S931;

Step S931, determining whether the current infrared detection system is the last selected system; if yes, go to step S932; if no, go to step S933;

Step S932, determining whether the operating duration of the infrared sensor exceeds a preset duration (30s); if yes, go to step S935, if no, go to step S934;

Step S933, taking the infrared sensor included in the infrared detection system next to the currently selected infrared detection system in succession as the to-be-operated infrared sensor, according to the sorted order from largest to smallest;

Step S934, failing to execute the instruction;

Step S935, determining whether the current infrared detection system is the last selected system; if yes, go to step S930; if no, go to step S920;

Step S940, determining whether the gesture information is a valid gesture; if yes, go to step S950; if no, go to step S932;

Step S950, acquiring a gesture instruction corresponding to the gesture information, and executing the gesture instruction; and Step S960, controlling the infrared sensor to be in sleeping state.

The present invention provides a control method for remote controller, which can achieve all-round detection within the indoor space, and at the same time avoid the privacy and security concerns that users worry about due to camera monitoring gestures. At the same time, by setting different remote controller devices, the remote controller control system can match different remote controllers to achieve the real sense of one operation for multiple controls. Further, by controlling the device with gesture, the problem that the voice remote controller cannot immediately respond to the user's operation due to the network quality may be solved. Furthermore, using infrared gesture detection devices at multiple directions, the problem of reading gesture failure due to indoor object obstruction, etc. is solved. At the same time, by performing close detection in the form of wake-up, power consumption is reduced.

Figure 10:
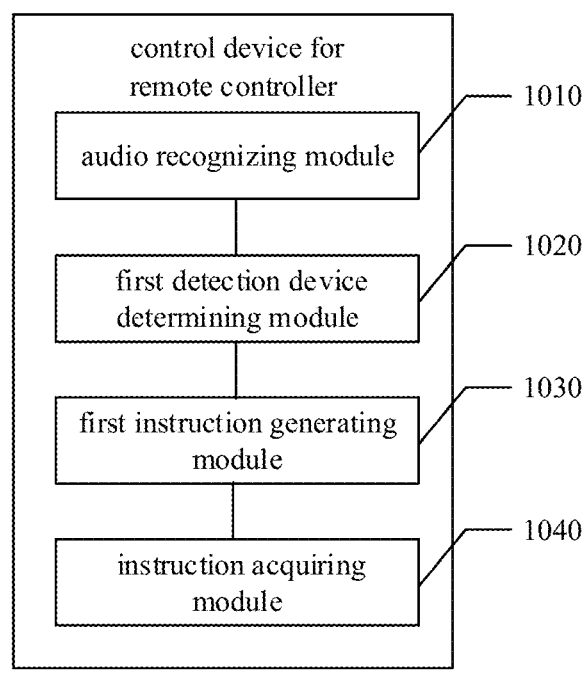
FIG. 10 schematically shows a block diagram of an apparatus for controlling remote controller according to an exemplary embodiment of the present invention.

The present disclosure also provides a control device for remote controller. Referring to FIG. 10, the control device for remote controller may include an audio recognizing module 1010, a first detection device determining module 1020, a first instruction generating module 1030, and an instruction acquiring module 1040.

The audio recognizing module 1010 is configured to receive to-be-recognized audios respectively transmitted by a plurality of infrared detection systems, and recognize each to-be-recognized audio based on a preset audio recognizing model to obtain an audio recognizing result.

The first detection device determining module 1020 is configured to determine a to-be-operated infrared detection system from the infrared detection systems according to an audio loudness of each to-be-recognized audio, in a case where the audio recognizing result is determined as a valid instruction associated with controlling the remote controller;

The first instruction generating module 1030 is configured to generate a drive instruction corresponding to the to-be-operated infrared detection system, and transmit the drive instruction to the to-be-operated infrared detection system, to cause the to-be-operated infrared detection system to be in operating state; and The instruction acquiring module 1040 is configured to acquire a control instruction determined according to gesture information detected by the to-be-operated infrared detection system in operating state, and control the remote controller to perform a function corresponding to the control instruction.

In an exemplary embodiment of the present disclosure, the remote controller has a plurality of sub-remote controllers, each sub-remote controller controlling a different device, and the control device for remote controller further includes:

a first determining module, configured to determine whether the audio recognizing result is a valid instruction associated with controlling any sub-remote controller in the remote controller, according to a remote controller matching rule;

wherein, the remote controller matching rule is determined according to a remote controller parameter.

In an exemplary embodiment of the present disclosure, the determining the to-be-operated infrared detection system from the infrared detection systems according to the audio loudness of each to-be-recognized audio includes:

detecting a size of audio decibel included in the to-be-recognized audio, and sorting each to-be-recognized audio according to the size of audio decibel; and determining the to-be-recognized audio with largest audio decibel according to a sorting result, and determining the infrared detection system having the to-be-recognized audio with largest audio decibel as the to-be-operated infrared detection system.

In an exemplary embodiment of the present disclosure, the acquiring the control instruction determined according to gesture information detected by the to-be-operated infrared detection system in operating state includes:

receiving gesture information generated according to a gesture image detected by the to-be-operated infrared detection system and transmitted by the to-be-operated infrared detection system in operating state;

determining whether the gesture information is a valid gesture according to a gesture matching rule in a case where it is determined that the gesture information includes a gesture shape, wherein the gesture matching rule is generated according to a function that the remote controller is able to perform; and acquiring the control instruction corresponding to the gesture information in a case where the gesture information is determined as the valid gesture.

In an exemplary embodiment of the present disclosure, the control device further includes:

an audio determining module configured to determine a next to-be-recognized audio neighboring to the to-be-recognized audio with the largest audio decibel according to the sorting result, in a case where it is determined that the gesture information includes no gesture shape;

a second detection device determining module, configured to determine the infrared detection system corresponding to the next to-be-recognized audio as the to-be-operated infrared detection system; and a second instruction generating module, configured to generate a driving instruction corresponding to the to-be-operated infrared detection system, and transmit the driving instruction to the to-be-operated infrared detection system, to cause the to-be-operated infrared detection system to be in operating state.

In an exemplary embodiment of the present disclosure, the recognizing each to-be-recognized audio based on the preset audio recognizing model to obtain the audio recognizing result includes:

recognizing the each to-be-recognized audio using the preset audio recognizing model to obtain the audio recognizing result, wherein the preset audio recognizing model includes one or more of a deep neural network, a convolutional neural network, a long short-term memory network, and a hidden Marko network.

In an exemplary embodiment of the present disclosure, the control device for remote controller further includes:

an infrared detection system quantity calculating module configured to calculate a number of infrared detection systems required to be disposed in a current space, according to a space size of the current space where the remote controller is located and attribute information of each infrared detection system.

In an exemplary embodiment of the present disclosure, the control device for remote controller further includes:

an installation position calculating module, configured to calculate an operating area of each infrared detection system according to the space size and the attribute information, and calculate a to-be-installed position of each infrared detection system according to the operating area.

In an exemplary embodiment of the present disclosure, the control device for remote controller further includes:

an operating dead zone calculating module, configured to calculate an operating dead zone of each infrared detection system according to the current space and the operating area; and an installation position adjusting module, configured to adjust the to-be-installed position according to the operating dead zone to obtain a target installing position.

The specific details of each module in the above-mentioned remote controller control device have been described in detail in the corresponding remote controller control method, and thus are not repeated here.

It should be noted that although several modules or units of the apparatus for action performance are mentioned in the above detailed description, this division is not mandatory. Indeed, according to embodiments of the present invention, the features and functions of two or more modules or units described above may be embodied in one module or unit. Conversely, the features and functions of one module or unit described above may be further divided into multiple modules or units to be embodied.

Additionally, although the various steps of the methods of the present invention are depicted in the figures in a particular order, this does not require or imply that the steps must be performed in that particular order, or that all illustrated steps must be performed to achieve the desired result. Additionally or alternatively, certain steps may be omitted, multiple steps may be combined into one step for execution, and/or one step may be divided into multiple steps for execution, and the like.

In an exemplary embodiment of the present invention, an electronic device capable of implementing the above method is also provided.

As will be appreciated by one skilled in the art, various aspects of the present invention may be implemented as a system, method or program product. Therefore, various aspects of the present invention may be embodied in the following forms, namely: a complete hardware implementation, a complete software implementation (including firmware, microcode, etc.), or a combination of hardware and software aspects, which may be collectively referred to herein as implementations "circuit", "module" or "system".

An electronic device 1100 according to this embodiment of the present invention is described below with reference to FIG. 11. The electronic device 1100 shown in FIG. 11 is only an example, and should not impose any limitation on the function and scope of use of the present disclosure.

Figure 11:
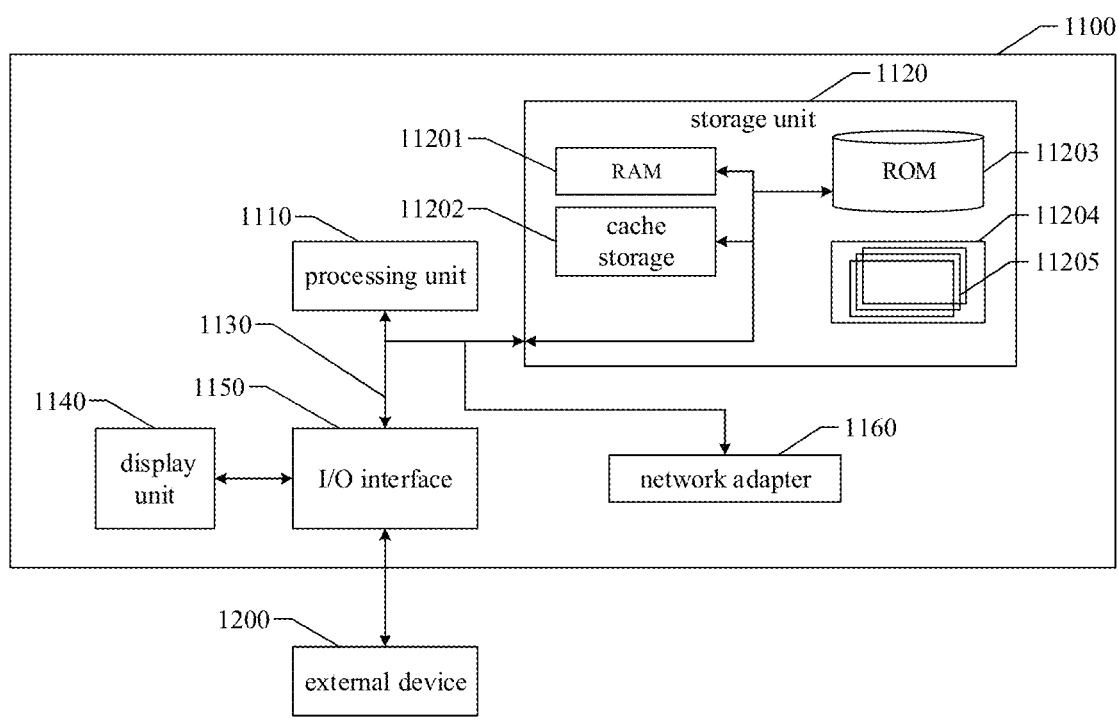
FIG. 11 schematically shows an electronic device for implementing the above-mentioned method for controlling remote controller according to an exemplary embodiment of the present invention.

As shown in FIG. 11, the electronic device 1100 is in form of a general-purpose computing device. Components of the electronic device 1100 may include, but are not limited to: the above-mentioned at least one processing unit 1110, the above-mentioned at least one storage unit 1120, a bus 1130 connecting different system components (including the storage unit 1120 and the processing unit 1110), and a display unit 1140.

The storage unit stores program codes, and the program codes can be executed by the processing unit 1110, so that the processing unit 1110 executes steps of various exemplary methods according to the present invention described in the above-mentioned "DETAILED DESCRIPTION" section of this specification. For example, the processing unit 1110 may execute the steps shown in FIG. 1: step S110: receiving to-be-recognized audios respectively transmitted by a plurality of infrared detection systems, and recognizing each to-be-recognized audio based on a preset audio recognizing model to obtain an audio recognizing result; Step S120: determining a to-be-operated infrared detection system from the infrared detection systems according to an audio loudness of each to-be-recognized audio, in a case where the audio recognizing result is determined as a valid instruction associated with controlling the remote controller; Step S130: generating a drive instruction corresponding to the to-be-operated infrared detection system, and transmitting the drive instruction to the to-be-operated infrared detection system, to cause the to-be-operated infrared detection system to be in operating state; and Step S140: acquiring a control instruction determined according to gesture information detected by the to-be-operated infrared detection system in operating state, and controlling the remote controller to perform a function corresponding to the control instruction.

The storage unit 1120 may include a readable medium in the form of a volatile storage unit, such as a random access storage unit (RAM) 11201 and/or a cache storage unit 11202, and may further include a read only storage unit (ROM) 11203.

The storage unit 1120 may also include a program/utility 11204 having a set (at least one) of program modules 11205 including, but not limited to, an operating system, one or more application programs, other program modules, and program data, and each or some combination of these examples may include an implementation of a network environment.

The bus 1130 may be representative of one or more of several types of bus structures, including a memory cell bus or memory cell controller, a peripheral bus, a graphics acceleration port, a processing unit, or a local area bus using any of a variety of bus structures.

The electronic device 1100 may also communicate with one or more external devices 1200 (e.g., keyboards, pointing devices, Bluetooth devices, etc.), with one or more devices that enable a user to interact with the electronic device 1100, and/or with any device (e.g., router, modem, etc.) that enables the electronic device 1100 to communicate with one or more other computing devices. Such communication may be implemented through input/output (I/O) interface 1150. Also, the electronic device 1100 may communicate with one or more networks (e.g., a local area network (LAN), a wide area network (WAN), and/or a public network such as the Internet) through a network adapter 1160. As shown in the drawings, the network adapter 1160 communicates with other modules of electronic device 1100 via bus 1130. It should be appreciated that, although not shown, other hardware and/or software modules may be used in conjunction with electronic device 1100, including but not limited to: microcode, device drivers, redundant processing units, external disk drive arrays, RAID systems, tape drives and data backup storage systems.

From the description of the above embodiments, those skilled in the art can easily understand that the exemplary embodiments described herein may be implemented by software, or may be implemented by software combined with necessary hardware. Therefore, the technical solutions according to the embodiments of the present disclosure may be embodied in the form of software products, and the software products may be stored in a non-volatile storage medium (which may be CD-ROM, U disk, mobile hard disk, etc.) or on the network, including several instructions to cause a computing device (which may be a personal computer, a server, a terminal device, or a network device, etc.) to execute the method according to an embodiment of the present disclosure.

In an exemplary embodiment of the present disclosure, there is also provided a computer-readable storage medium on which a program product capable of implementing the above-described method of the present specification is stored. In some possible embodiments, aspects of the present invention may also be implemented in the form of a program product comprising program code, and when the program product is executed on a terminal device, the program code is used to cause the terminal device to perform the steps according to various exemplary embodiments of the present invention described in the "DETAILED DESCRIPTION" section above in this specification.

A program product 1500 for implementing the above method according to an embodiment of the present invention, can adopt a portable compact disk read only memory (CD-ROM) and include program codes, and can be executed on a terminal device such as a personal computer. However, the program product of the present invention is not limited thereto, and in this document, a readable storage medium may be any tangible medium that contains or stores a program that can be used by or in conjunction with an instruction execution system, apparatus, or device.

The program product may employ any combination of one or more readable media. The readable medium may be a readable signal medium or a readable storage medium. The readable storage medium may be, for example, but not limited to, an electrical, magnetic, optical, electromagnetic, infrared, or semiconductor system, apparatus or device, or a combination of any of the above. More specific examples (non-exhaustive list) of readable storage media include: electrical connections with one or more wires, portable disks, hard disks, random access memory (RAM), read only memory (ROM), erasable programmable read only memory (EPROM or flash memory), optical fiber, portable compact disk read only memory (CD-ROM), optical storage devices, magnetic storage devices, or any suitable combination of the foregoing.

A computer readable signal medium may include a propagated data signal in baseband or as part of a carrier wave with readable program code embodied thereon. Such propagated data signals may take a variety of forms, including but not limited to electromagnetic signals, optical signals, or any suitable combination of the foregoing. A readable signal medium can also be any readable medium, other than the readable storage medium, that can transmit, propagate, or transport the program for use by or in connection with the instruction execution system, apparatus, or device.

Program code embodied on a readable medium may be transmitted using any suitable medium, including but not limited to wireless, wireline, optical fiber cable, RF, etc., or any suitable combination of the foregoing.

Program code for carrying out operations of the present invention may be written in any combination of one or more programming languages, including object-oriented programming languages—such as Java, C++, etc., as well as conventional procedural programming language—such as the "C" language or similar programming language. The program code may execute entirely on the user computing device, partly on the user device, as a stand-alone software package, partly on the user computing device and partly on a remote computing device, or entirely on the remote computing device or server. Where remote computing devices are involved, the remote computing devices may be connected to the user computing device over any kind of network, including a local area network (LAN) or wide area network (WAN), or may be connected to an external computing device (e.g., connecting through the Internet using an Internet service provider).

Furthermore, the above-mentioned figures are merely schematic illustrations of the processes included in the methods according to the exemplary embodiments of the present invention, and are not intended to be limiting. It is easy to understand that the processes shown in the above figures do not indicate or limit the chronological order of these processes. In addition, it is also readily understood that these processes may be performed synchronously or asynchronously, for example, in multiple modules.

Other embodiments of the present disclosure will readily suggest themselves to those skilled in the art upon consideration of the specification and practice of the invention disclosed herein. This application is intended to cover any variations, uses, or adaptations of the present disclosure that follow the general principles of the present disclosure and include common knowledge or techniques in the technical field not disclosed by the present disclosure. The specification and examples are to be regarded as exemplary only, with the true scope and spirit of the disclosure being indicated by the claims.

What is claimed is:

1. A control method for remote controller, comprising:
receiving to-be-recognized audios respectively from a plurality of detector systems, wherein each of the to-be-recognized audios is an audio signal received by each detector system with respect to a same audio source, and recognizing each of the to-be-recognized audios based on a preset audio recognizing model to obtain an audio recognizing result;
determining a to-be-operated detector system from the detector systems according to an audio loudness of each of the to-be-recognized audios, in a case where the audio recognizing result is determined as a valid instruction associated with controlling the remote controller;
generating a drive instruction corresponding to the to-be-operated detector system, and transmitting the drive instruction to the to-be-operated detector system, to cause the to-be-operated detector system to be in operating state to detect gestor information using an infrared detector; and
acquiring a control instruction determined according to gesture information detected by the to-be-operated detector system in operating state, and controlling the remote controller to perform a function corresponding to the control instruction,
wherein the determining the to-be-operated detector system from the detector systems according to the audio loudness of each of the to-be-recognized audios comprises: detecting a size of audio decibel comprised in the to-be-recognized audio, and sorting each of the to-be-recognized audios according to the size of audio decibel, and determining the to-be-recognized audio with largest audio decibel according to a sorting result, and determining the detector system having the to-be-recognized audio with largest audio decibel as the to-be-operated detector system,
wherein the acquiring the control instruction determined according to gesture information detected by the to-be-operated detector system in operating state comprises: receiving gesture information generated according to a gesture image detected by the to-be-operated detector system and transmitted by the to-be-operated detector system in operating state; determining whether the gesture information is a valid gesture according to a gesture matching rule in a case where it is determined that the gesture information comprises a gesture shape, wherein the gesture matching rule is generated according to a function that the remote controller is able to perform; and acquiring the control instruction corresponding to the gesture information in a case where the gesture information is determined as the valid gesture, and
wherein the method further comprises: in response to determining that the gesture information comprises no gesture shape, determining a next to-be-recognized audio neighboring to the to-be-recognized audio with the largest audio decibel according to the sorting result; determining the detector system corresponding to the next to-be-recognized audio as the to-be-operated detector system; and generating a driving instruction corresponding to the to-be-operated detector system, and transmitting the driving instruction to the to-be-operated detector system, to cause the to-be-operated detector system to be in operating state.

2. The control method according to claim 1, wherein the remote controller comprises a plurality of sub-remote controllers for controlling different devices respectively;
wherein after recognizing each of the to-be-recognized audios to obtain the audio recognizing result, the control method further comprises:
determining whether the audio recognizing result is a valid instruction associated with controlling any sub-remote controller in the remote controller, according to a remote controller matching rule;
wherein, the remote controller matching rule is determined according to a remote controller parameter.

3. The control method according to claim 1, wherein the recognizing each of the to-be-recognized audios based on the preset audio recognizing model to obtain the audio recognizing result comprises:
recognizing the each of the to-be-recognized audios using the preset audio recognizing model to obtain the audio recognizing result, wherein the preset audio recognizing model comprises one or more of a deep neural network, a convolutional neural network, a long short-term memory network, and a hidden Marko network.

4. The control method according to claim 3, further comprising:
calculating a number of detector systems required to be disposed in a current space, according to a space size of the current space where the remote controller is located and attribute information of each detector system.

5. The control method according to claim 4, further comprising:
calculating an operating area of each detector system according to the space size and the attribute information, and calculating a to-be-installed position of each detector system according to the operating area.

6. The control method according to claim 5, further comprising:
calculating an operating dead zone of each detector system according to the current space and the operating area; and
adjusting the to-be-installed position according to the operating dead zone to obtain a target installing position.

7. A system for controlling remote controller, comprising:
a plurality of detector systems, a processor and a memory, each detector system is respectively connected in communication with the processor and the memory;
each detector system comprises a controller, an audio receiving device and an infrared sensor, and the audio receiving device and the infrared sensor are connected in communication with the controller;
the controller is configured to control the audio receiving device and the infrared sensor to be in operating state, and transmit a to-be-recognized audio received by the audio receiving device to the processor;
the audio receiving device is used for receiving the to-be-recognized audio, and the infrared sensor is used for receiving gesture information; and
the memory is stored with computer instructions, and the processor is configured to execute the computer instructions to implement:
receiving to-be-recognized audios respectively from a plurality of detector systems, and recognizing each of the to-be-recognized audios based on a preset audio recognizing model to obtain an audio recognizing result;
determining a to-be-operated detector system from the detector systems according to an audio loudness of each of the to-be-recognized audios, in a case where the audio recognizing result is determined as a valid instruction associated with controlling the remote controller;

generating a drive instruction corresponding to the to-be-operated detector system, and transmitting the drive instruction to the to-be-operated detector system, to cause the to-be-operated detector system to be in operating state; and acquiring a control instruction determined according to gesture information detected by the to-be-operated detector system in operating state, and controlling the remote controller to perform a function corresponding to the control instruction, wherein the determining the to-be-operated detector system from the detector systems according to the audio loudness of each of the to-be-recognized audios comprises: detecting a size of audio decibel comprised in the to-be-recognized audio, and sorting each of the to-be-recognized audios according to the size of audio decibel; and determining the to-be-recognized audio with largest audio decibel according to a sorting result, and determining the detector system having the to-be-recognized audio with largest audio decibel as the to-be-operated detector system, wherein the acquiring the control instruction determined according to gesture information detected by the to-be-operated detector system in operating state comprises: receiving gesture information generated according to a gesture image detected by the to-be-operated detector system and transmitted by the to-be-operated detector system in operating state; determining whether the gesture information is a valid gesture according to a gesture matching rule in a case where it is determined that the gesture information comprises a gesture shape, wherein the gesture matching rule is generated according to a function that the remote controller is able to perform; and acquiring the control instruction corresponding to the gesture information in a case where the gesture information is determined as the valid gesture, and wherein the processor is configured to execute the computer instructions to further implement: in response to determining that the gesture information comprises no gesture shape, determining a next to-be-recognized audio neighboring to the to-be-recognized audio with the largest audio decibel according to the sorting result: determining the detector system corresponding to the next to-be-recognized audio as the to-be-operated detector system; and generating a driving instruction corresponding to the to-be-operated detector system, and transmitting the driving instruction to the to-be-operated detector system, to cause the to-be-operated detector system to be in operating state.

8. The system for controlling remote controller according to claim 7, wherein the processor is further stored with an application program, and the application program is executed by the processor to perform: configuring system codes for each detector system, and adding parameter information of the remote controller through the application program and storing the parameter in the memory.

9. The system for controlling remote controller according to claim 7, wherein the detector system and the processor and memory communicate via a local area network.

10. A computer non-transitory readable storage medium on which a computer program is stored, wherein when the computer program is executed by a processor, the control method for remote controller according to claim 1 is implemented.

11. An electronic device comprising:

a processor; and a memory for storing executable instructions for the processor;

wherein, the processor is configured to implement the control method for remote controller according to claim 1 by executing the executable instruction.

* * * * *